United States Patent
Lin et al.

(10) Patent No.: US 9,665,338 B2
(45) Date of Patent: May 30, 2017

(54) DISPLAY APPARATUS, VIDEO SYSTEM, DISPLAY METHOD AND PROJECTOR

(71) Applicant: DELTA ELECTRONICS, INC., Taoyuan (TW)

(72) Inventors: Bo-Tao Lin, Taoyuan (TW); JianHua Lu, Taoyuan (TW); Chun-Hua Zhang, Taoyuan (TW); Tsung-Cheng Lo, Taoyuan (TW); Mao-Hua Cheng, Taoyuan (TW); Chun-Wen Wang, Taoyuan (TW)

(73) Assignee: DELTA ELECTRONICS, INC. (TW)

( * ) Notice: Subject to any disclaimer, the term of this patent is extended or adjusted under 35 U.S.C. 154(b) by 104 days.

(21) Appl. No.: 14/614,850

(22) Filed: Feb. 5, 2015

(65) Prior Publication Data

US 2016/0147497 A1    May 26, 2016

(30) Foreign Application Priority Data

Nov. 21, 2014   (TW) .............................. 103140351 A

(51) Int. Cl.
G06F 3/14        (2006.01)
G09G 5/14        (2006.01)
G09G 5/12        (2006.01)

(52) U.S. Cl.
CPC .............. *G06F 3/1454* (2013.01); *G06F 3/14* (2013.01); *G09G 5/12* (2013.01); *G09G 5/14* (2013.01); *G09G 2358/00* (2013.01); *G09G 2370/022* (2013.01); *G09G 2370/16* (2013.01)

(58) Field of Classification Search
CPC combination set(s) only.
See application file for complete search history.

(56) References Cited

U.S. PATENT DOCUMENTS

| | | | |
|---|---|---|---|
| 7,434,166 B2 | 10/2008 | Acharya et al. | |
| 8,612,431 B2 * | 12/2013 | Busch | G06F 17/30696 707/705 |
| 8,732,579 B2 * | 5/2014 | Rossmann | G06F 3/04883 715/712 |
| 9,348,803 B2 * | 5/2016 | Vagell | G06F 17/24 |
| 2007/0130178 A1 * | 6/2007 | Kimura | G06F 3/1204 |
| 2010/0094932 A1 | 4/2010 | Nagasaka | |
| 2012/0141095 A1 | 6/2012 | Schwesinger et al. | |
| 2013/0027504 A1 | 1/2013 | Zhang | |

(Continued)

FOREIGN PATENT DOCUMENTS

| | | |
|---|---|---|
| CN | 101365097 | 2/2009 |
| CN | 102209230 | 10/2011 |
| CN | 102819415 | 12/2012 |

(Continued)

*Primary Examiner* — Van Chow
(74) *Attorney, Agent, or Firm* — Hauptman Ham, LLP

(57) ABSTRACT

A display method is applicable for a display apparatus. The display method includes transmitting preview data outputted by a client terminal to a host terminal such that the host terminal displays a preview image corresponding to the preview data. After the host terminal displays the preview image, if the host terminal outputs a first display permission signal, the display apparatus is utilized to display an image corresponding to an image signal outputted by the client terminal. A display apparatus, a video system and a projector are disclosed herein as well.

7 Claims, 7 Drawing Sheets

(56) References Cited

U.S. PATENT DOCUMENTS

2013/0262560 A1  10/2013  Ivashin et al.
2014/0111596 A1   4/2014  Greveres, Jr.

FOREIGN PATENT DOCUMENTS

| EP | 2023630 | 2/2009 |
| TW | 200524429 | 7/2005 |
| TW | 201044331 | 12/2010 |

* cited by examiner

DISPLAY APPARATUS, VIDEO SYSTEM, DISPLAY METHOD AND PROJECTOR

RELATED APPLICATIONS

This application claims priority to Taiwan Application Serial Number 103140351, filed Nov. 21, 2014, the entirety of which is herein incorporated by reference.

BACKGROUND

Technical Field

The present disclosure relates to a display apparatus. More particularly, the present disclosure relates to a display apparatus which can provide preview functions, and a corresponding display method.

Description of Related Art

As the development of information technology, display apparatus is becoming more and more applicable. The display apparatus normally is like a computer monitor, a TV monitor or a projector. Among them, the projector includes the advantages of small volume, high mobility, adjustable frame size, and the capability of displaying large size images. The projector has been widely applied in circumstances of teaching, meeting or movie playing.

When a projector is applied in a circumstance of teaching, the computers of a teacher and multiple students can all be connected with the projector, such that the projector can display the images outputted by the computers of the teacher or the students. However, sometimes the image outputted by the computers of the students may include contents which are not suitable to be displayed in public by the projector (e.g., improper images with violent or pornographic contents). The teaching quality may thus be affected by accidentally displaying the improper images outputted from the computers of the students.

SUMMARY

In one aspect, the present disclosure is related to a display apparatus. The display apparatus includes a display unit and a processing module. The processing module is electrically connected with the display unit. The processing module is configured to transmit preview data outputted by a client terminal to a host terminal before the display unit displaying an image corresponding to an image signal outputted by the client terminal. The processing module is further configured to receive a first preview request outputted by the host terminal, and output a second preview request to the client terminal according to the first preview request such that the client terminal outputs the preview data to the processing module according to the second preview request. The processing module then transmits the preview data to the host terminal. After the processing module transmits the preview data to the host terminal, if the processing module receives a first display permission signal outputted by the host terminal, the processing module is further configured to output a second display permission signal to the client terminal according to the first display permission signal such that the client terminal outputs the image signal to the processing module according to the second display permission signal. The processing module is further configured to control the display unit to display the corresponding image according to the image signal.

In another aspect, the present disclosure is related to a video system. The video system includes at least one client terminal, a host terminal, and a display apparatus. The at least one client terminal is configured to output preview data. The host terminal is configured to display a preview image corresponding to the preview data. The display apparatus is configured to transmit preview data outputted by the at least one client terminal to the host terminal before displaying an image corresponding to an image signal outputted by the at least one client terminal.

In still another aspect, the present disclosure is related to a display method applicable for a display apparatus. The display method includes transmitting preview data outputted by a client terminal to a host terminal such that the host terminal displays a preview image corresponding to the preview data; and if the host terminal outputs a first display permission signal, utilizing the display apparatus to display an image corresponding to an image signal outputted by the client terminal.

In yet another aspect, the present disclosure is related to a projector. The projector is configured to transmit image data outputted by a client terminal to a host terminal such that the host terminal displays an image corresponding to the image data. The projector is further configured to receive a first image transmission request outputted by the host terminal, and output a second image transmission request to the client terminal according to the first image transmission request such that the client terminal outputs the image data to the projector according to the second image transmission request. The projector transmits the image data to the host terminal. The projector is further configured to establish a wireless connection between the projector and the host terminal according to a connection request outputted by the host terminal, and a wireless connection between the projector and the client terminal according to a connection request outputted by the client terminal.

By applying the techniques disclosed in the present disclosure, the image outputted by the client terminal could be previewed on the host terminal before the client terminal utilizes the display apparatus to display the image outputted by the client terminal. The display apparatus will not display the image outputted by the client terminal before receiving the display permission signal outputted by the host terminal. Thereby, the situation that the display apparatus displays the image outputted by the client terminal, which includes inappropriate contents, could be avoided. Moreover, by establishing a wireless connection between the display apparatus and the host terminal and a wireless connection between the display apparatus and the client terminal, the host terminal and the client terminal could interchange data via the display apparatus. Therefore, the number of connections between the host terminal and the client terminal and the number of connections between the clients required for interchanging data can be reduced. Furthermore, the host terminal can receive the image data outputted by the client terminal via the display apparatus. Consequently, the host terminal can receive the image data outputted by each of the clients without having to establish the connection with each of the clients.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
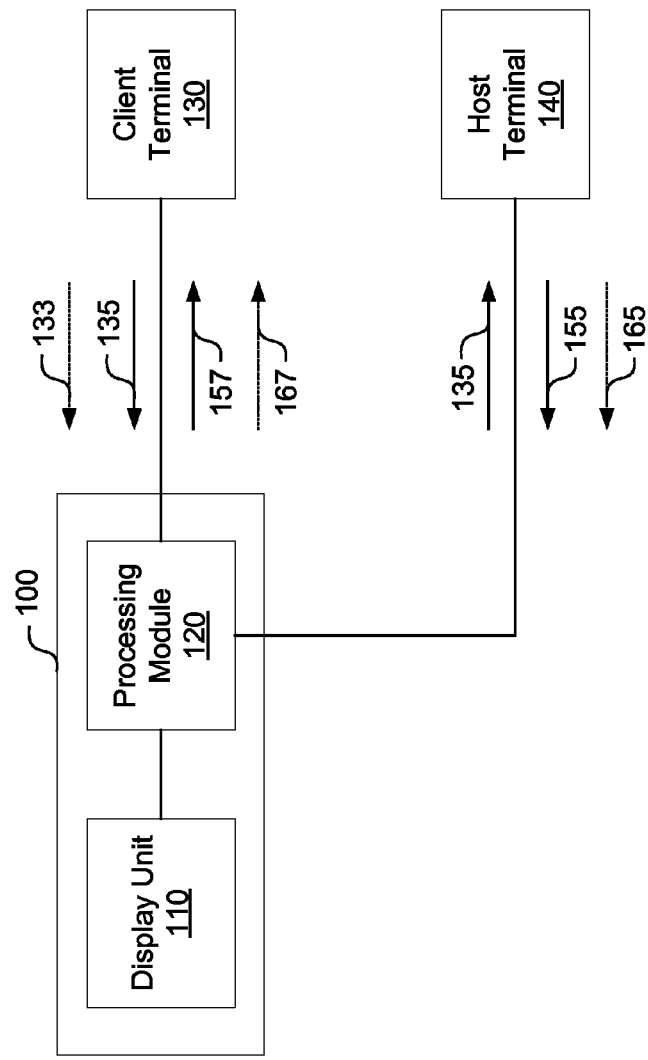
FIG. 1A is a block diagram of a display apparatus in accordance with one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Reference is made first to FIG. 1A. FIG. 1A is a block diagram of a display apparatus 100 in accordance with one embodiment of the present disclosure. The display apparatus 100 can be a projector or a monitor, but is not limited in this regard. The display apparatus 100 includes a display unit 110 and a processing module 120. In one embodiment of the present disclosure, the processing module 120 is a chip. In another embodiment of the present disclosure, the display apparatus 100 includes memory and a processor. The processing module 120 is stored in the memory and configured for execution by the processor.

The processing module 120 is electrically connected with the display unit 110. The processing module 120 is configured to transmit preview data 135 outputted by a client terminal 130 to a host terminal 140 before the display unit 110 displays an image corresponding to an image signal 133 outputted by the client terminal 130 such that the host terminal 140 displays a preview image corresponding to the preview data 135.

The client terminal 130 and the host terminal 140 can be personal computers, laptop computers, notebooks, smart phones, and etc., but are not limited thereto. In one embodiment of the present disclosure, both of the client terminal 130 and the host terminal 140 are personal computers, and the display apparatus 100, the client terminal 130 and the host terminal 140 are applied in an environment for education. In an example, the user of the host terminal 140 is a teacher, and the user of the client terminal 130 is a student. The student utilizes the client terminal 130 to output the image signal 133. The processing module 120 is configured to transmit preview data 135 outputted by the client terminal 130 to the host terminal 140 before the display unit 110 displays the image corresponding to the image signal 133 outputted by the client terminal 130 such that the teacher could preview the preview image corresponding to the preview data 135.

According to one embodiment of the present disclosure, the preview data 135 include desktop snapshot data of the client terminal 130 or real-time desktop video data of the client terminal 130, and the image signal 133 includes the real-time desktop video data of the client terminal 130. Thereby, in the abovementioned embodiment, the teacher could preview the desktop snapshot or the real-time desktop video of the student's personal computer before the display unit 110 displays the real-time desktop video of the student's personal computer. It has to be explained that the preview data 135 are not limited to the desktop snapshot of the client terminal 130 or the real-time desktop video of the client terminal 130, and the image signal 133 is not limited to the real-time desktop video of the client terminal 130, either. According to another embodiment of the present disclosure, the preview data 135 include the snapshot of an application executed on the client terminal 130, and the image signal 133 includes the real-time video of the application executed on the client terminal 130.

According to another embodiment of the present disclosure, the processing module 120 is further configured to receive a first preview request 155 outputted by the host terminal 140, and output a second preview request 157 to the client terminal 130 according to the first preview request 155 such that the client terminal 130 outputs the preview data 135 to the processing module 120 according to the second preview request 157. The processing module 120 then transmits the preview data 135 to the host terminal 140. Thereby, in the previous embodiment, when the teacher asks the student to utilize the client terminal 130 to output the image corresponding to the image signal 133, the teacher could utilize the host terminal 140 to output the first preview request 155 such that the client terminal 130 outputs the preview data 135 according to the second preview request 157.

According to another embodiment of the present disclosure, after the processing module 120 transmits the preview data 135 to the host terminal 140, if the processing module 120 receives a first display permission signal 165 outputted by the host terminal 140, the processing module 120 is further configured to output a second display permission signal 167 to the client terminal 130 according to the first display permission signal 165 such that the client terminal 130 outputs the image signal 133 to the processing module 120 according to the second display permission signal 167. The processing module 120 controls the display unit 110 to display the corresponding image according to the image signal 133. Thereby, in the previous embodiment, after the host terminal 140 displays the preview image (e.g., the desktop snapshot of the student's personal computer) corresponding to the preview data 135, the teacher could utilize the host terminal 140 to output the first display permission signal 165. Consequently, the client terminal 130 outputs the image signal 133 (e.g., the real-time desktop video of the student's personal computer) to the display apparatus 100 for being displayed on the display apparatus 100 according to the second display permission signal 167. Therefore, the teacher can decide whether or not to output the first display permission signal 165 according to, for example, the desktop snapshot of the student's personal computer displayed by host terminal 140. If the teacher feels that the real-time desktop video of the student's personal computer is not proper to be displayed by the display apparatus 100 with the desktop snapshot of the student's personal computer, the teacher could choose not to utilize the host terminal 140 to output the first display permission signal 165. Consequently, the display apparatus 100 will not display the real-time desktop video of the student's personal computer.

It has to be explained that the connection between the display apparatus 100 and the host terminal 140 and the connection between the display apparatus 100 and the client terminal 130 can be wired connections or wireless connections. In one embodiment of the present disclosure, the connection between the display apparatus 100 and the host terminal 140 and the connection between the display apparatus 100 and the client terminal 130 are both wireless connections, and the processing module 120 is further configured to establish a wireless connection between the display apparatus 100 and the host terminal 140 according to a connection request outputted by the host terminal 140, and a wireless connection between the display apparatus 100 and the client terminal 130 according to a connection request outputted by the client terminal 130. The abovementioned wireless connections can be WiFi wireless connections, but are not limited herein.

Figure 1B:
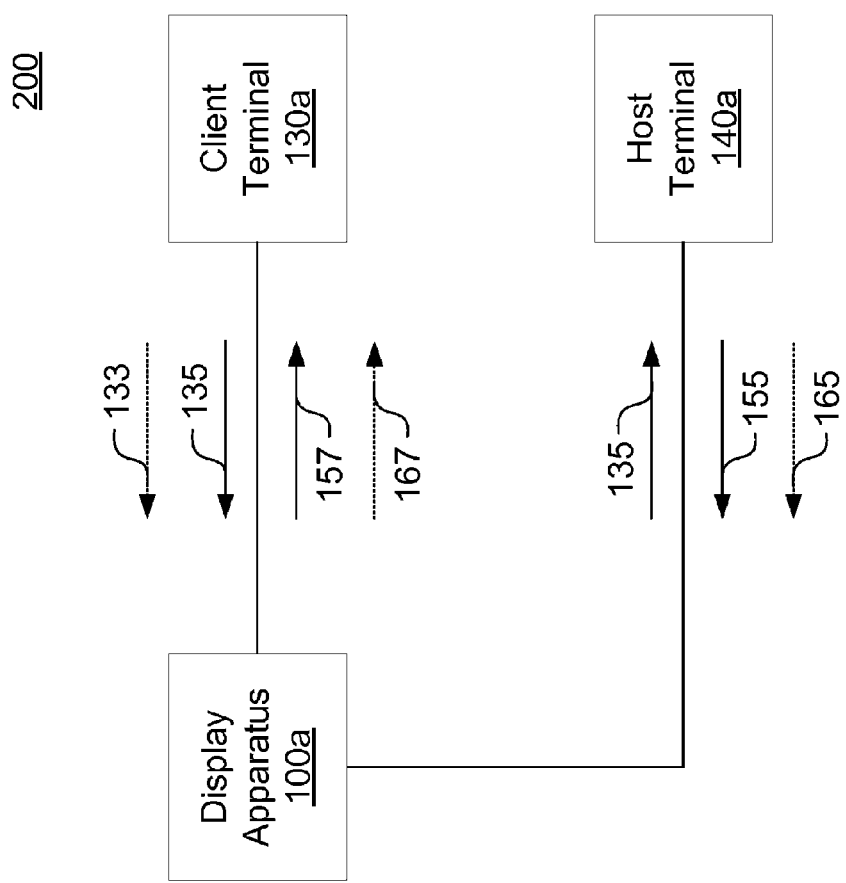
FIG. 1B is a block diagram of a video system in accordance with one embodiment of the present disclosure.

Moreover, in the present embodiment, the processing module 120 is included in the display apparatus 100. However, in practical applications, the processing module 120 is not limited to be included in the display apparatus 100. According to another embodiment of the present disclosure, the processing module 120 is included in another electronic apparatus, and is electrically connected with the display apparatus 100 (e.g., connected via a HDMI interface). Furthermore, the number of the client terminal and the number of the host terminal are not limited to one, as illustrated in FIG. 1A. In another embodiment of the present disclosure, the display apparatus 100 is wirelessly connected with more than one host terminals and more than one client terminals Reference is made also to FIG. 1B. FIG. 1B is a block diagram of a video system 200 in accordance with one embodiment of the present disclosure. The video system 200 includes a display apparatus 100a, at least one client terminal 130a and a host terminal 140a. The display apparatus 100a, the at least one client terminal 130a and the host terminal 140a can be the display apparatus 100, the client terminal 130 and the host terminal 140 as illustrated in FIG. 1A, but are not limited thereto.

The display apparatus 100a is configured to transmit preview data 135 outputted by the at least one client terminal 130a to the host terminal 140a before displaying an image corresponding to an image signal 133 outputted by the at least one client terminal 130a such that the host terminal 140a displays a preview image corresponding to the preview data 135.

In the present embodiment, the operations between the display apparatus 100a, the client terminal 130a and the host terminal 140a are similar to those explained in the embodiment illustrated in FIG. 1A, and hence are not described again herein.

According to one embodiment of the present disclosure, the at least one client terminal 130a outputs a preview request message after receiving the second preview request 157, and outputs the preview data 135 to the display apparatus 100a according to a user input command for the client terminal. Thereby, in the abovementioned embodiment, the student's personal computer (i.e., the client terminal 130a) outputs a preview request message to ask if the student agrees to output the preview data 135 (e.g., the desktop snapshot of the student's personal computer) after receiving the second preview request 157 such that the teacher could preview the preview image corresponding to the preview data 135. If the student agrees to output the preview data 135, the student's personal computer (i.e., the client terminal 130a) outputs the preview data 135 to the display apparatus 100a according to the user input command for the client terminal (e.g., the approval command inputted by the student utilizing a keyboard or a mouse of the personal computer). On the contrary, if the student does not agree to output the preview data 135, the student's personal computer will not output the preview data 135. Consequently, the privacy of the student can be better protected.

According to another embodiment of the present disclosure, the host terminal 140a displays a preview image corresponding to the preview data 135 after receiving the preview data 135, and outputs the first display permission signal 165 to the display apparatus 100a according to a user command for the host terminal. Thereby, in the abovementioned embodiment, the teacher's personal computer (i.e., the host terminal 140a) displays a preview image (e.g., the desktop snapshot of the student's personal computer) corresponding to the preview data 135 after receiving the preview data 135. If the teacher agrees the student's personal computer (i.e., the client terminal 130a) to output the desktop snapshot of the student's personal computer to the display apparatus 100a after seeing the abovementioned preview image, the teacher could utilize a keyboard or a mouse of the host terminal 140a to generate a user command for the host terminal. The host terminal 140a could then output the first display permission signal 165 to the display apparatus 100a according to the abovementioned user command for the host terminal In the abovementioned embodiment, the display apparatus transmits the preview data outputted by the client terminal to the host terminal before displaying the image corresponding to the image signal outputted by the client terminal such that the host terminal displays the preview image corresponding to the preview data. In another embodiment of the present disclosure, the client terminal could utilize the display apparatus to transmit image data to the host terminal. The abovementioned image data are not limited to the preview data. An embodiment will be given in the following paragraph to explain the abovementioned operations.

Figure 1C:
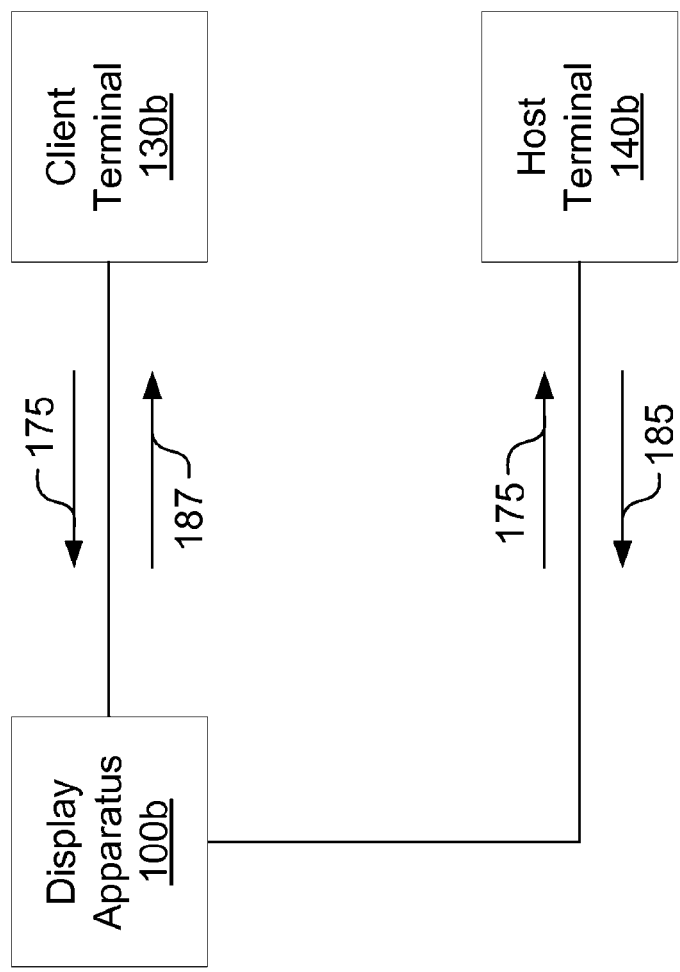
FIG. 1C is a block diagram of a display apparatus in accordance with one embodiment of the present disclosure.

Additional reference is made to FIG. 1C. FIG. 1C is a block diagram of a display apparatus 100b in accordance with one embodiment of the present disclosure. In FIG. 3C, the display apparatus 100b, the client terminal 130b and the host terminal 140b can be the display apparatus 100, the client terminal 130 and the host terminal 140 as illustrated in FIG. 1A, but are not limited thereto. In one embodiment of the present disclosure, the display apparatus 100b can be a projector or a monitor, where the client terminal 130b and the host terminal 140b can be personal computers, laptop computers, notebooks, smart phones, and etc., but are not limited thereto.

The display apparatus 100b is configured to transmit image data 175 outputted by the client terminal 130b to the host terminal 140b such that the host terminal 140b displays an image corresponding to the image data 175. It has to be explained that the image data 175 are not limited to preview data.

According to one embodiment of the present disclosure, the display apparatus 100b is further configured to receive a first image transmission request 185 outputted by the host terminal 140b, and output a second image transmission request 187 to the client terminal 130b according to the first image transmission request 185 such that the client terminal 130b outputs the image data 175 to the display apparatus 100b according to the second image transmission request 187. The display apparatus 100b transmits the image data 175 to the host terminal 140b.

According to another embodiment of the present disclosure, the display apparatus 100b is further configured to establish a wireless connection between the display apparatus 100b and the host terminal 140b according to a connection request outputted by the host terminal 140b, and a wireless connection between the display apparatus 100b and the client terminal 130b according to a connection request outputted by the client terminal 130b.

Figure 2:
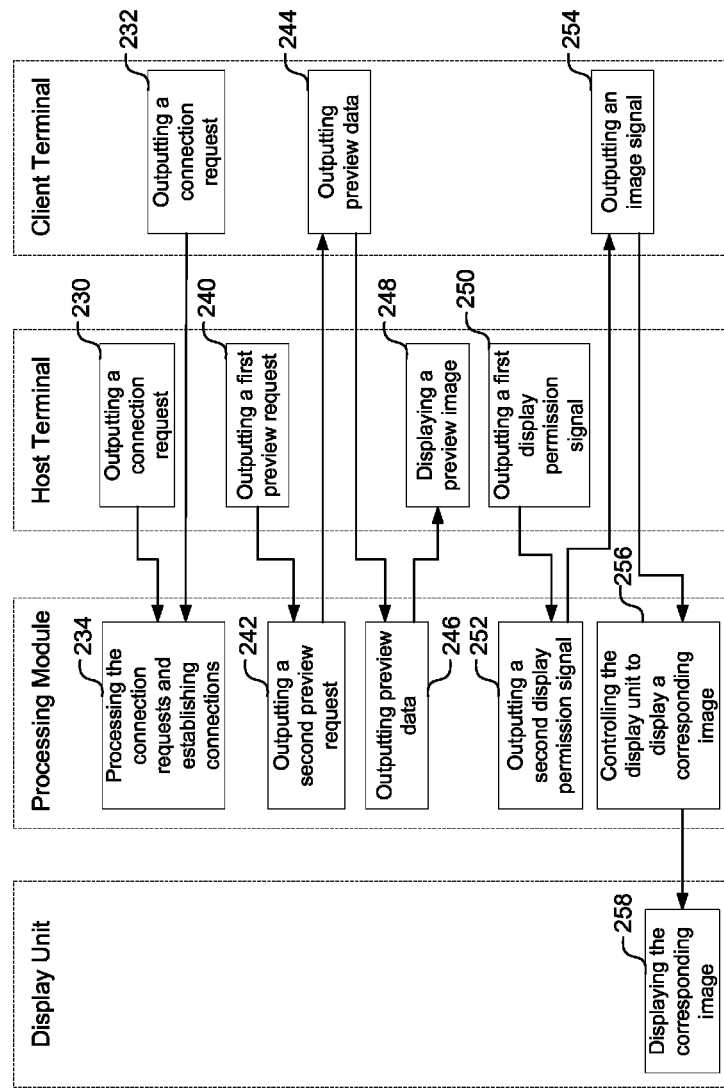
FIG. 2 is a schematic diagram illustrating the operations between the display apparatus, the host terminal and the client terminal in accordance with one embodiment of the present disclosure.

The following paragraph will explain the operations between the display apparatus, the host terminal and the client terminal as illustrated in FIG. 1A and FIG. 1B according to another embodiment of the present disclosure. Reference is now made to FIG. 2. FIG. 2 is a schematic diagram illustrating the operations between the display apparatus, the host terminal and the client terminal in accordance with one embodiment of the present disclosure.

In step 230 and step 232, the host terminal and the client terminal output connection request to the processing module. In step 234, the processing module establishes a connection between the display apparatus and the host terminal according to the connection request outputted by the host terminal, and a connection between the display apparatus and the client terminal according to the connection request outputted by the client terminal.

In step 240, the host terminal outputs a first preview request to the processing module. In step 242, the processing module outputs a second preview request to the client terminal according to the first preview request. In step 244, the client terminal outputs preview data to the display apparatus according to the second preview request. In step 246, the processing module transmits the preview data to the host terminal after receiving the preview data outputted by the client terminal. In step 248, the host terminal displays a preview image corresponding to the preview data.

In step 250, the host terminal outputs a first display permission signal to the processing module. In step 252, the processing module outputs a second display permission signal to the client terminal according to the first display permission signal. In step 254, the client terminal outputs an image signal to the processing module according to the second display permission signal. In step 256 and step 258, the control module controls the display unit to display a corresponding image according to the image signal.

Figure 3:
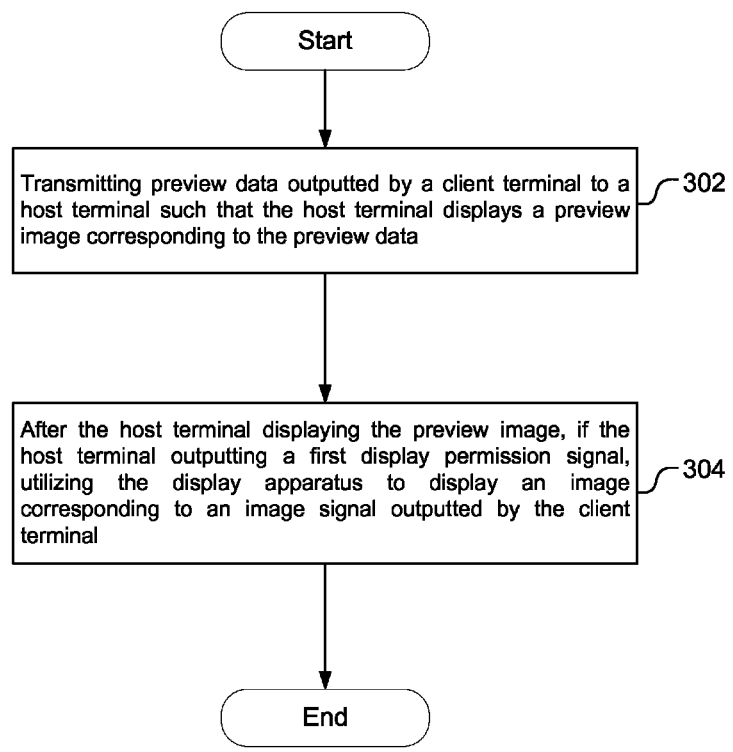
FIG. 3 is a flow chart of a display method in accordance with one embodiment of the present disclosure.

Reference is further made to FIG. 3. FIG. 3 is a flow chart of a display method in accordance with one embodiment of the present disclosure. The display method may be implemented by the display apparatus 100 illustrated in FIG. 1A, but is not limited in this regard. For convenience and clarity, it is assumed that the display method is implemented by the display apparatus 100 illustrated in FIG. 1A.

In step 302, the display apparatus 100 transmits preview data 135 outputted by the client terminal 130 to the host terminal 140 such that the host terminal 140 displays a preview image corresponding to the preview data 135.

In step 304, after the host terminal 140 displays the preview image, if the host terminal 140 outputs a first display permission signal 165, the display apparatus 100 displays an image corresponding to an image signal 133 outputted by the client terminal 130.

Figure 4:
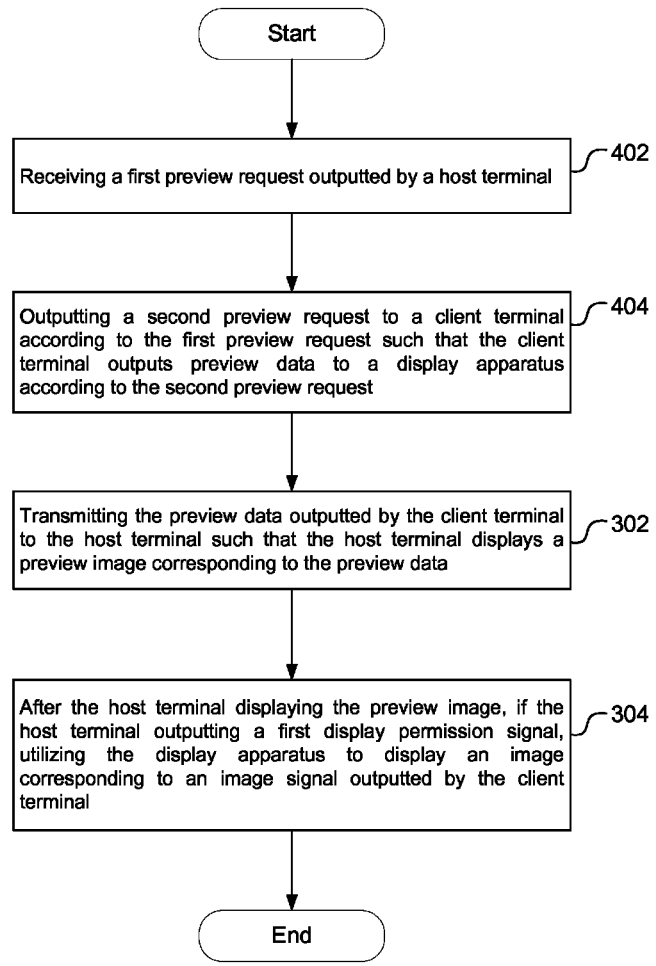
FIG. 4 is a flow chart of a display method in accordance with one embodiment of the present disclosure.

Reference is now made to FIG. 4. FIG. 4 is a flow chart of a display method in accordance with one embodiment of the present disclosure. Compared with the display method illustrated in FIG. 3, the display method illustrated in FIG. 4 further includes steps 402 and 404. The display method may be implemented by the display apparatus 100 illustrated in FIG. 1A, but is not limited in this regard. For convenience and clarity, it is assumed that the display method is implemented by the display apparatus 100 illustrated in FIG. 1A.

In step 402, the display apparatus 100 receives a first preview request 155 outputted by the host terminal 140.

In step 404, the display apparatus 100 outputs a second preview request 157 to the client terminal 130 according to the first preview request 155 such that the client terminal 130 outputs the preview data 135 to the display apparatus 110 according to the second preview request 157.

Figure 5:
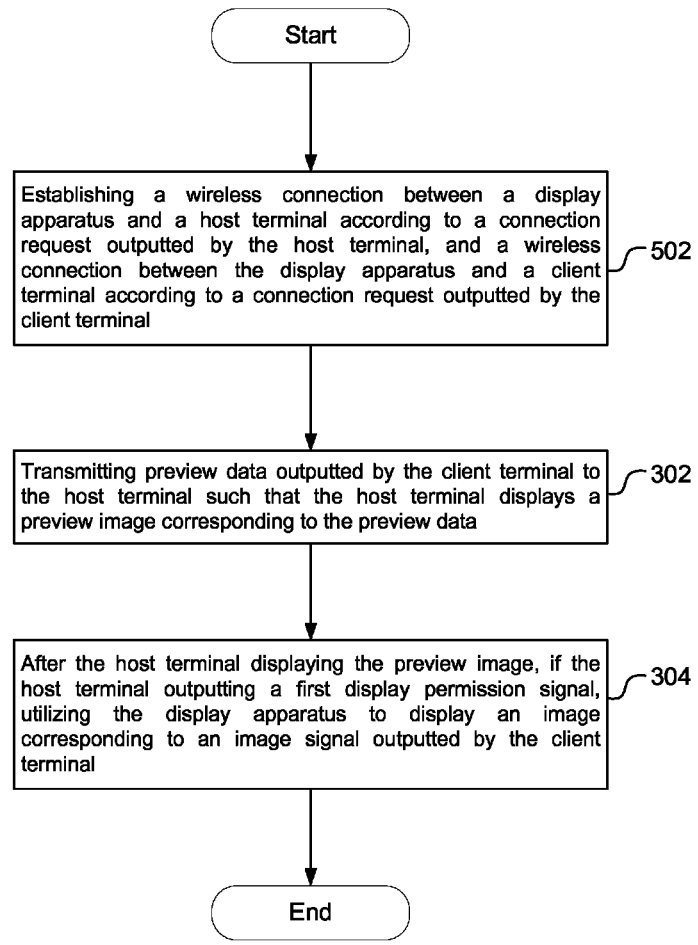
FIG. 5 is a flow chart of a display method in accordance with one embodiment of the present disclosure.

Reference is made also to FIG. 5. FIG. 5 is a flow chart of a display method in accordance with one embodiment of the present disclosure. Compared with the display method illustrated in FIG. 3, the display method illustrated in FIG. 5 further includes step 502. The display method may be implemented by the display apparatus 100 illustrated in FIG. 1A, but is not limited in this regard. For convenience and clarity, it is assumed that the display method is implemented by the display apparatus 100 illustrated in FIG. 1A.

In step 502, the display apparatus 100 establishes a wireless connection between the display apparatus 100 and the host terminal 140 according to a connection request outputted by the host terminal 140, and a wireless connection between the display apparatus 100 and the client terminal 130 according to a connection request outputted by the client terminal 130.

The above illustrations include exemplary operations, but the operations are not necessarily performed in the order shown. Operations may be added, replaced, changed order, and/or eliminated as appropriate, in accordance with the spirit and scope of various embodiments of the present disclosure.

By applying the techniques disclosed in the present disclosure, the image outputted by the client terminal could be previewed on the host terminal before the client terminal utilizes the display apparatus to display the image outputted by the client terminal. The display apparatus will not display the image outputted by the client terminal before receiving the display permission signal outputted by the host terminal. Thereby, the situation that the display apparatus displays the image outputted by the client terminal, which includes improper contents, could be avoided. Moreover, by establishing a wireless connection between the display apparatus and the host terminal and a wireless connection between the display apparatus and the client terminal, the host terminal and the client terminal could interchange data via the display apparatus. Therefore, the number of connections between the host terminal and the client terminal and the number of connections between the clients required for interchanging data can be reduced. Furthermore, the host terminal can receive the image data outputted by the client terminal via the display apparatus. Consequently, the host terminal can receive the image data outputted by each of the clients without having to establish the connection with each of the clients.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A video system, comprising:
   at least one client terminal configured to output preview data;
   a host terminal configured to display a preview image corresponding to the preview data; and
   a display apparatus configured to transmit the preview data outputted by the at least one client terminal to the host terminal before displaying an image corresponding to an image signal outputted by the at least one client terminal,
   wherein the display apparatus is further configured to receive a first preview request outputted by the host terminal, and output a second preview request to the at least one client terminal according to the first preview request such that the at least one client terminal outputs the preview data to the display apparatus according to the second preview request; and the display apparatus then transmits the preview data to the host terminal.

2. The video system of claim 1, wherein the at least one client terminal outputs a preview request message after receiving the second preview request, and outputs the preview data to the display apparatus according to a user input command for the client terminal.

3. The video system of claim 1, wherein, after the display apparatus transmits the preview data to the host terminal, if the display apparatus receives a first display permission signal outputted by the host terminal, the display apparatus is further configured to output a second display permission signal to the at least one client terminal according to the first display permission signal such that the at least one client terminal outputs the image signal to the display apparatus according to the second display permission signal; and the display apparatus displays the corresponding image according to the image signal.

4. The video system of claim 3, wherein the host terminal displays a preview image corresponding to the preview data after receiving the preview data, and outputs the first display permission signal to the display apparatus according to a user command for the host terminal.

5. The video system of claim 1, wherein the preview data comprise desktop snapshot data of the at least one client terminal or real-time desktop video data of the at least one client terminal.

6. The video system of claim 1, wherein the display apparatus is further configured to establish a wireless connection between the display apparatus and the host terminal according to a connection request outputted by the host terminal, and a wireless connection between the display apparatus and the client terminal according to a connection request outputted by the client terminal.

7. The video system of claim 1, wherein the display apparatus is a projector.

* * * * *